United States Patent

[11] 3,579,798

[72] Inventor William P. Henderson
 1109 Crayton Road, Naples, Fla. 33940
[21] Appl. No. 799,027
[22] Filed Feb. 13, 1969
[45] Patented May 25, 1971

[54] METHOD OF VERIFYING THE REPLACEMENT OF A DAMAGED WINDSHIELD
 12 Claims, 11 Drawing Figs.
[52] U.S. Cl................................................. 29/401,
 29/426, 296/84
[51] Int. Cl........................................... B23p 7/00
[50] Field of Search............................................ 29/401,
 426, 427; 40/(Inquired); 283/(Inquired);
 101/(Inquired); 296/84

[56] References Cited
UNITED STATES PATENTS
3,372,459 3/1968 Lambright..................... 29/427X

*Primary Examiner*—John F. Campbell
*Assistant Examiner*—D. C. Reiley
*Attorney*—Barnes, Kisselle, Raisch and Choate ABSTRACT: Replacement of a damaged windshield on a motor vehicle or the like is verified by removing the damaged windshield to obtain access to an identification serial number of the vehicle located immediately adjacent the windshield and then taking an impression of the vehicle serial number before installing a new replacement windshield. The impression is taken on a label which is then attached to a statement which is forwarded to an insurance company for payment. Verification of the type of replacement windshield installed is also obtained by removing a manufacturer's label from the replacement windshield and attaching the manufacturer's label to the label bearing the impression.

PATENTED MAY25 1971 3,579,798
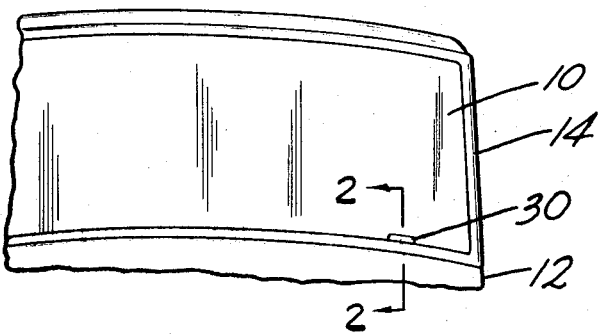
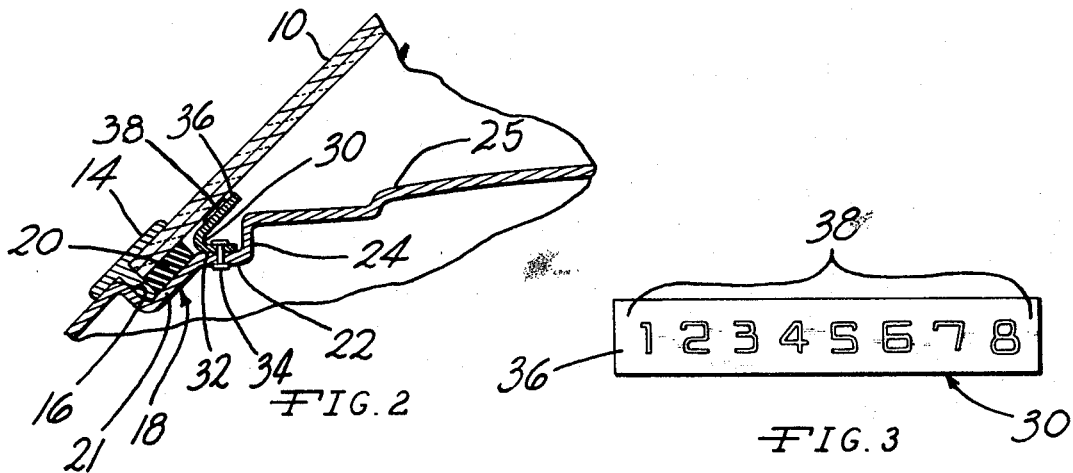
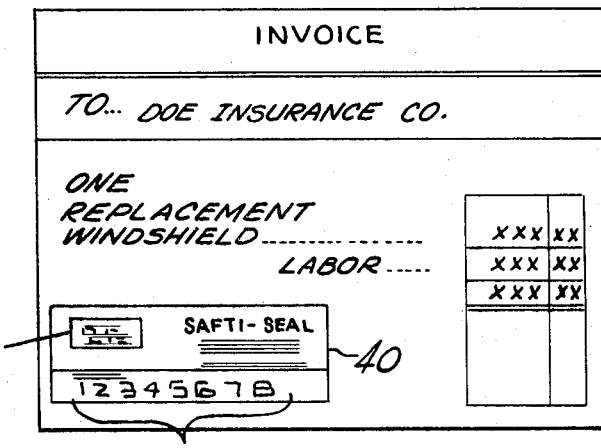
INVENTOR
WILLIAM P. HENDERSON
BY
Barnes, Kisselle, Raisch & Choate
ATTORNEYS

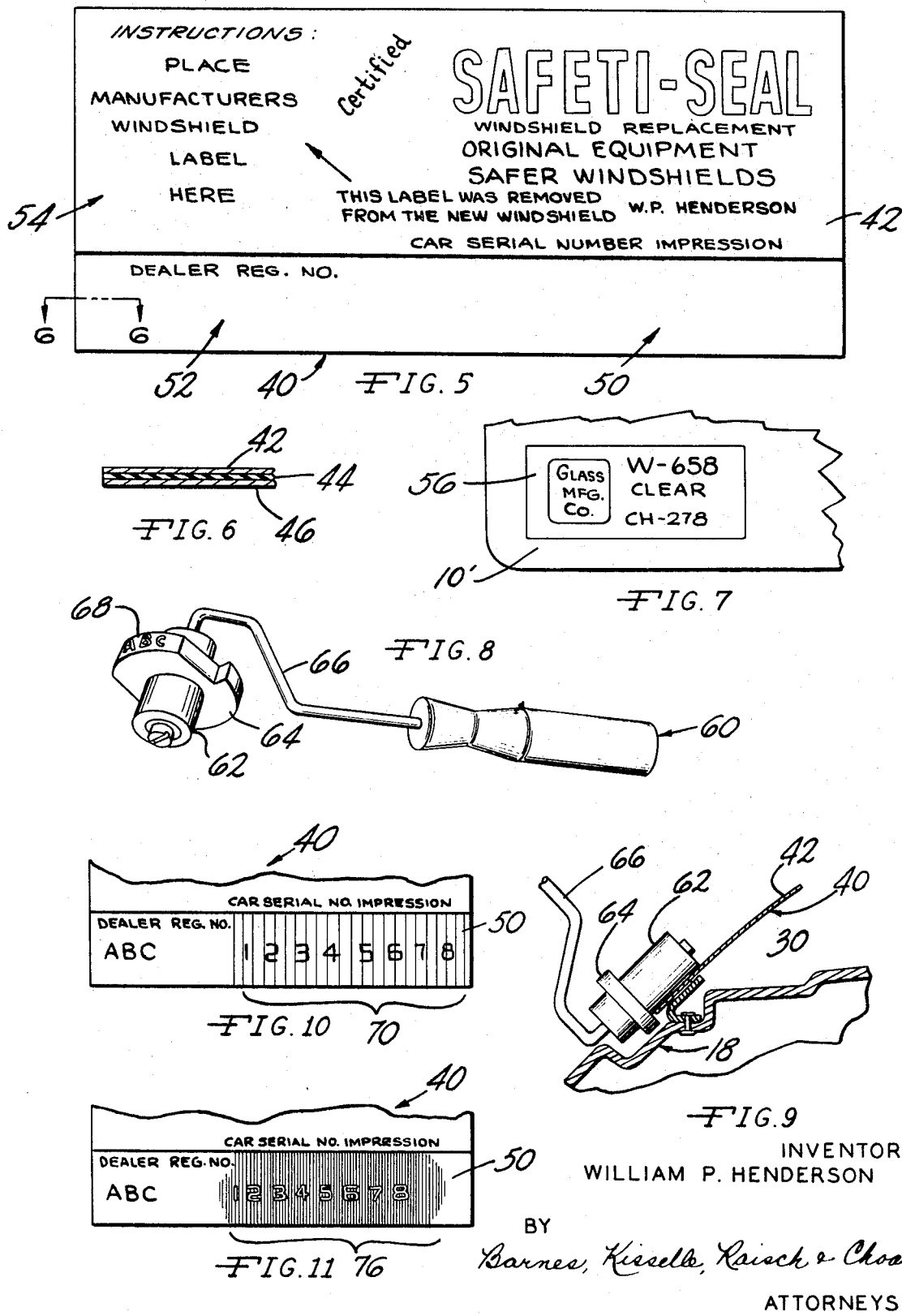

METHOD OF VERIFYING THE REPLACEMENT OF A DAMAGED WINDSHIELD

The cost of windshield replacement is, in most cases, borne by an insurance company. It is estimated that in one large metropolitan area in the United States, approximately 65,000 windshields are replaced annually and insurance companies pay for approximately 60,000 of these windshields. At wholesale installed prices, this cost is on the order of 5 million dollars. However, in view of the relatively low cost for each replacement windshield and the large volume involved, there have undoubtedly been cases of fraud and abuse by windshield installers collecting for windshields that were not, in fact, replaced. As a practical matter, insurance adjusters cannot, or at least they do not, personally verify each and every replacement windshield that is paid for by the insurance company. For example, false insurance claims for replacement windshields undoubtedly occur in connection with new car purchases. When a used car is traded on a new car purchase, the purchaser may be requested to report a damaged windshield to his insurance company even though the damage may be minor and replacement of the windshield is not essential to resell the used car. In this situation, a dealer may collect for the replacement windshield but resell the car without installing the replacement windshield. Also there are undoubtedly cases where an insurance company is billed for tinted glass or a high quality windshield when in fact a cheaper clear glass or glass of lower quality was installed.

A recently enacted Motor Vehicle Safety Standard No. 115, entitled "Vehicle Identification Number —Passenger Car," provides that passenger cars must have a vehicle identification number sunk into, or embossed upon, either a part of the vehicle (other than the glazing) that is not designed to be removed except for repair or a separate plate which is permanently affixed to the vehicle part. The vehicle identification number must be located inside the passenger compartment so as to be readable through the glazing or windshield by an observer looking through the windshield adjacent the left (driver's side) windshield pillar. Automobile manufacturers have located the identification number on the top of the dashboard immediately behind the windshield and closely adjacent the driver's side windshield pillar. In most passenger car models, the construction of the dash and the windshield make the identification number inaccessible but viewable through the windshield.

Because the identification number is in an inaccessible location, an impression of the serial number cannot be taken directly from the identification number plate unless the windshield has been removed. The present invention contemplates utilizing the inaccessible vehicle identification number to verify that a damaged windshield has been removed from a particular vehicle. The serial number is reproduced on a label by taking a direct impression from the identification number after the damaged windshield is removed. The impression verifies that the damaged windshield has been removed and this, in turn, serves to verify that the replacement windshield has been installed. Additional verification of the installation of a new windshield is obtained from a glass manufacturer's label that is removed from the replacement windshield.

The objects of the present invention include providing a method and means to eliminate, or at least substantially reduce, overcharges and/or false insurance claims for windshield replacement; to reduce the cost to insurance companies in handling claims for windshield replacements; and/or to provide to the windshield replacement business and the insurance business a practical and economical verification that a replacement windshield has been installed.

Further objects of the present invention are to provide a method and means for positively identifying the vehicle on which a replacement windshield is installed and/or to provide an effective means for identifying the replacement windshield to the person paying for the installation.

Other objects, features and advantages of the present invention will become apparent in connection with the description, the appended claims and the accompanying drawings in which:

FIG. 1 is a fragmentary front view of an automobile provided with one form of an identification number plate meeting the aforementioned safety standard;

FIG. 2 is a fragmentary sectional view of the windshield and identification number plate taken on line 2–2 of FIG. 1;

FIG. 3 is a front view of the identification plate of FIG. 2;

FIG. 4 illustrates a label impressed with a reproduction of the serial number according to the present invention and mounted on an invoice;

FIG. 5 is an enlarged front view of the label of FIG. 4;

FIG. 6 is a fragmentary cross section of the label taken on line 6–6 of FIG. 5;

FIG. 7 illustrates a glass manufacturer's label which is removed and fastened on the label of FIG. 5;

FIG. 8 is a perspective view of a roller useful in taking the impression of the serial number;

FIG. 9 is a fragmentary cross-sectional view similar to FIG. 2 with the windshield removed to illustrate taking an impression of the serial number;

FIG. 10 is an enlarged fragmentary view of a label having an impression taken from an embossed serial number; and FIG. 11 is an enlarged fragmentary view of a label having an impression taken from an incised serial number.

Referring more particularly to the drawings, FIGS. 1 and 2 show a laminated glass windshield 10 mounted in a conventional manner on an automobile 12 by means of a molding 14. The details of a specific mounting arrangement for the windshield 10 are not essential to the present invention and hence will be described only to an extent necessary to understand the present invention. The lower edge of the windshield sets in a channel 16 formed in the sheet metal body 18. A sealing strip 20 is disposed between the lower rear edge of windshield 10 and a rearwardly inclined wall 21 of channel 16. Molding 14 may have any conventional shape and it is removably fastened on the vehicle body by conventional means to hold windshield 10 in place. The body 18 has a flat horizontal portion 22 extending rearwardly from wall 19 and the lower edge of windshield 10, and a vertically extending body portion 24 bent upwardly from the rear of the flat portion 22. Body 18 extends rearwardly from portion 24 to form the top of the dash 25 which is shown for illustration as being unpadded. An identification plate 30 is permanently fastened at its base 32 on the flat body portion 22 by a pair of rivets 34. Plate 30 has an upstanding portion 36 slightly return bent with respect to the base 32 so as to be disposed immediately adjacent the lower rear surface of windshield 10. A vehicle serial number 38 is embossed in raised numerals on the front face of the plate portion 36.

The arrangement and construction of the plate 30, windshield 10 and body 18 described hereinabove generally correspond to that on one model passenger car presently sold commercially. With the arrangement described, it will be apparent that the embossed serial number 38 is not accessible with windshield 10 in place. Hence an impression of the serial number 38 cannot be taken without removing parts or tampering with the plate 30. Although other automobile models use slightly different arrangements of the identification plate, windshield and dash, on practically all of the passenger car models presently sold commercially, the identification plate corresponding to plate 30 is located so that the serial number is substantially inaccessible but an impression of the number can be taken when the windshield is removed.

According to the present invention, in the event that it becomes necessary to replace the windshield 10, the damaged windshield is removed. The serial number 38 on the front face of the plate portion 36 is then accessible for taking an impression which is used to verify that the windshield has been removed from the vehicle bearing that particular serial number. FIG. 5 illustrates a label 40 of the present invention upon which the serial number impression is taken. The label 40 comprises a generally rectangular front sheet 42 of suitable material such as paper. In the preferred embodiment, sheet 42 is light colored such as yellow or white. There is a layer of adhesive 44 coated on the rear side of the sheet 42 and the adhesive is covered by a pulloff sheet 46 of suitable material such as paper. Cover sheet 46 is removed to expose adhesive 44 when label 40 is to be adhered on some other object.

The label 40 includes an area generally designated at 50 where the serial number impression is to be taken, an area 52 for a dealer registration number and an area 54 for a glass manufacturer's label which is taken off the new windshield to be installed. A typical glass manufacturer's label 56 attached to a new windshield 10' is illustrated in FIG. 7. Typically label 56 may specify that the replacement glass is at least original equipment quality and that it meets safety requirements and other standards for windshields. The label 56 will generally also show a part number and show whether the windshield is clear glass or more expensive tinted or shaded glass.

FIG. 8 illustrates one form of a roller 60 contemplated by the present invention for taking the serial number impression. The roller 60 generally comprises a cylindrical roller 62 and a larger diameter segmented disc 64. Roller 62 and disc 64 are individually rotatably mounted on the lower free end of a wire stem 66 so that one can rotate free of the other. In the embodiment being described, the cylindrical roller 62 is made of soft metallic lead and has an axial dimension at least exceeding the height of the plate portion 36. The disc 64 is provided with indicia 68 identifying a registration number of the dealer installing the replacement windshield. The addition of the dealer's registration number and the disc 64 is optional, although desirable, and is not essential to the primary objects of the present invention.

After a damaged windshield 10 has been removed, the label 40 is place over the plate portion 36 with the front sheet 42 exposed, facing toward the left in FIG. 9, the impression area 50 overlaying the serial number 38 and the cover sheet 46 abutting the serial number. The lead roller 62 is then moved over the exposed surface of sheet 42 with slight pressure applied thereto so that a lead imprint reproduces the serial number, dark-on-light, as illustrated by the serial number reproduction 70 (FIG. 10). After the impression is taken, the new windshield 10' (FIG. 7) is installed, either prior to or after installation of the windshield 10', label 56 is removed from the new windshield and adhered to the label 40 at the area 54. Label 40 is then attached to the invoice 72 shown in FIG. 4 and forwarded for payment, as for example to an insurance company. The insurance company thus has a record verifying that a damaged windshield was removed from the vehicle identified by the serial number 38 and that a new windshield identified by the label 56 was installed.

Although the roller 60 has been described as having a lead roller 62 for taking the serial number impression, it will be apparent that other techniques can be used. By way of example, a roller corresponding to roller 62 could be in the form of an ink pad, which, when inked and rolled over the label 40, would provide dark-on-light reproduction of the serial number similar to that illustrated in FIG. 10. In still another embodiment of the present invention, a label corresponding to the label 40 would have incorporated therein a marking media such as carbon paper or encapsulated ink. Roller 62 could be formed of other materials such as graphite (carbon). Indeed an ordinary lead pencil produces a legible reproduction.

The present invention is also useful where an engraved serial number (corresponding to serial number 38) is incised or cut into the identification number plate so that the numerals are depressed from the front face of the plate. The verification method for the depressed serial number is essentially the same as that described hereinabove. When the label 40 is placed over the identification number plate having depressed numerals and rolled with roller 62, the serial number is reproduced in the manner illustrated at 76 in FIG. 11. The numerals remain light and lead from roller 62 forms a dark background to produce a light-on-dark reproduction of the serial number.

It is to be understood that particular embodiments of the method and apparatus for verifying windshield replacement have been described herein for purposes of illustration and are not intended to indicate limits of the present invention, the scope of which is defined by the following claims.

I claim:

1. The method of verifying on an invoice, statement or the like, replacement of a damaged windshield on a motor vehicle or the like wherein said vehicle is provided with vehicle identification indicia imprinted on a part of said vehicle that is either a member not designed to be removed except for repair or a separate plate which is permanently affixed to such a member, said indicia being located immediately adjacent said windshield so that said indicia are substantially inaccessible without first removing said windshield and said indicia are viewable through said windshield, comprising the steps of removing said damaged windshield from said vehicle to thereby render said identification indicia accessible for taking an impression of said identification indicia from said part, and then reproducing said identification indicia on a media by taking a direct impression of said identifying indicia so that said reproduced indicia on said media serves to verify removal of said damaged windshield from the vehicle identified by said identification indicia.

2. The method set forth in claim 1 wherein said windshield is replaced by a replacement windshield bearing a removable label which identifies said replacement windshield and wherein said method further comprises the steps of installing said replacement windshield in said vehicle after taking said impression, removing said label, and operatively associating said label with said impression to verify installation of said replacement windshield and identify the windshield from which the label is removed.

3. The method set forth in claim 1 wherein said media is incorporated in a statement sheet of charges for transmittal for payment.

4. The method set forth in claim 3 wherein said label is associated with said impression by securing said label on said statement sheet.

5. The method set forth in claim 4 wherein said label is secured on said statement sheet by securing said label on said media and securing said media on said statement sheet.

6. The method set forth in claim 1 wherein said indicia are raised indicia and said impression is taken by overlaying said indicia with said media and applying pressure to said media over the area of said indicia.

7. The method set forth in claim 6 wherein said media is light-colored sheet material and said impression is taken by moving over said sheet in the area of said indicia on said part a dark-colored marking member to thereby obtain on said media a dark-on-light reproduction of said indicia.

8. The method set forth in claim 7 wherein a marking member made of a material selected from the group consisting of lead and carbon is moved over said media.

9. The method set forth in claim 1 wherein said indicia are depressed into said part, and said impression is taken by applying pressure to said media over an area corresponding to the area of said part surrounding and including said indicia.

10. The method set forth in claim 9 wherein said media is light-colored sheet material and said impression is taken by moving over said sheet material a dark-colored marking member to thereby obtain on said media a light-on-dark reproduction of said indicia.

11. The method of verifying on an invoice, statement or the like replacement of a damaged windshield on a motor vehicle or the like wherein said vehicle is provided with a vehicle identification number in the form of indicia either sunk into or embossed upon a part of the vehicle, other than the glazing, that is either a member not designed to be removed except for repair or a separate plate which is permanently affixed to such a member, said part being located on the dash of said vehicle immediately adjacent the windshield at the driver side of said vehicle with said indicia disposed immediately behind said windshield so that said indicia are substantially inaccessible without first removing said windshield, comprising the steps of removing said windshield so as to render said indicia accessible for taking an impression of said indicia directly from said part, overlaying said indicia with a sheet of paperlike material with one face of said sheet material abutting said part, reproducing said identification indicia on said sheet material by taking a direct impression of said indicia onto said sheet material, installing a replacement windshield in said vehicle after taking said impression, removing from said replacement windshield a label identifying said replacement windshield, attaching said label to said sheet material, and then transmitting said sheet material for payment of costs for replacing said damaged windshield so that said impression on said sheet material serves to identify said vehicle in which the replacement windshield was installed and said manufacturer's label serves to identify said replacement windshield installed in said vehicle.

12. In the method of verifying replacement of a damaged windshield on a vehicle or the like, the steps of removing the damaged windshield and then taking an impression of vehicle identification indicia located on said vehicle so as to be substantially inaccessible without first removing said windshield whereby said impression verifies that said damaged windshield has been removed from the vehicle identified by said indicia.